UNITED STATES PATENT OFFICE.

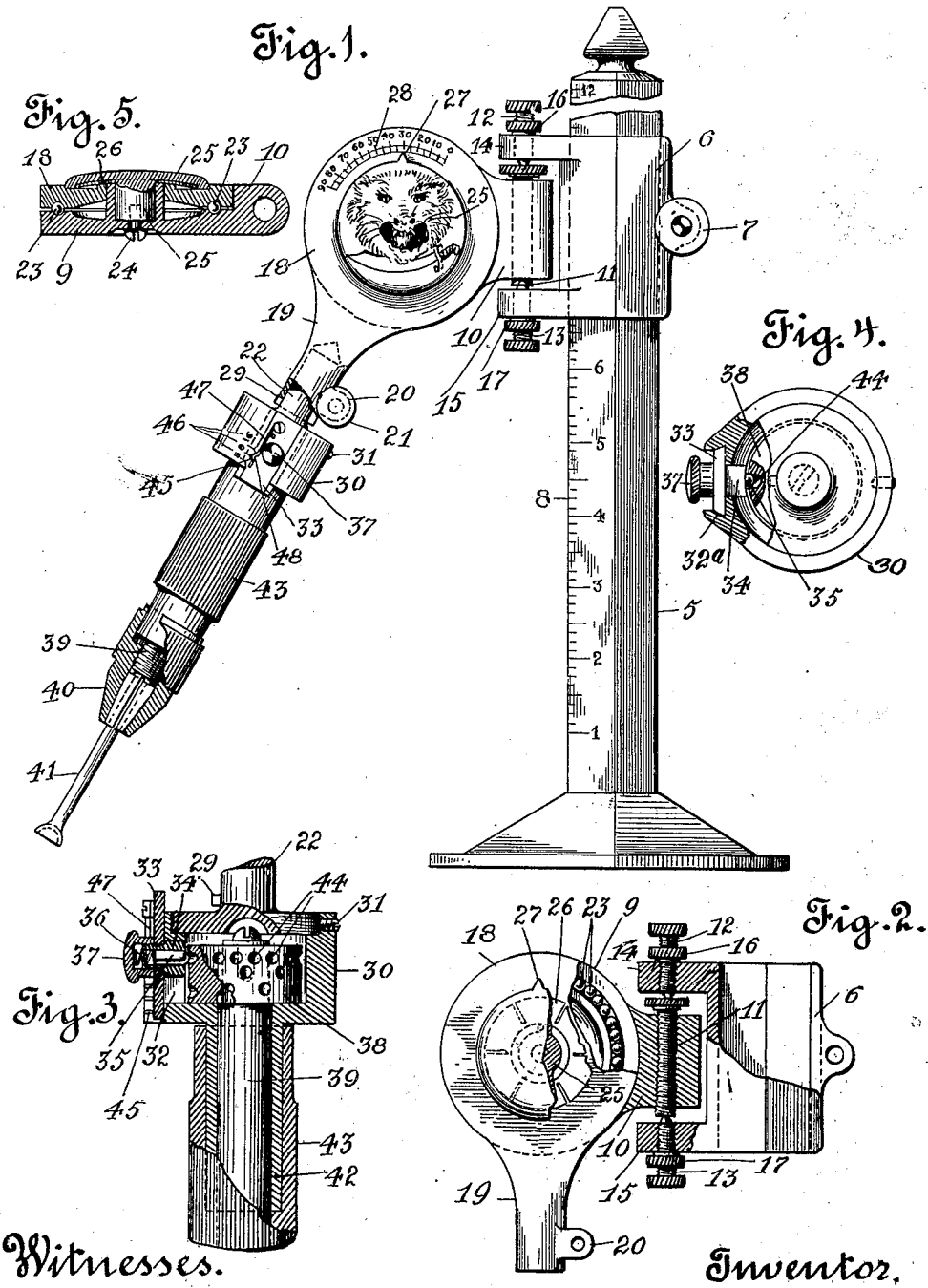

GERTRUDE S. REYNOLDS McMULLEN, OF LOS ANGELES, CALIFORNIA.

GEM CUTTING AND POLISHING MACHINE.

No. 925,016. Specification of Letters Patent. Patented June 15, 1909.

Application filed November 15, 1907. Serial No. 402,352.

*To all whom it may concern:*

Be it known that I, GERTRUDE S. REYNOLDS McMULLEN, a citizen of the United States, residing in the city of Los Angeles, county of Los Angeles, and State of California, have invented new and useful Improvements in Gem Cutting and Polishing Machines, of which the following is a specification.

My invention relates to a machine for cutting and finishing precious stones and the object thereof is to produce a simple and efficient machine, by means of which the facets on precious stones can be perfectly cut and polished. I accomplish this object by the machine described herein and illustrated in the accompanying drawings in which;

Figure 1 is a side elevation partly in section, of my improved machine. Figs. 2, 3, 4 and 5 are sectional details of different portions of the machine.

In the drawings 5 is a standard which rests upon a table or shelf, not shown, at the side of the lap. Upon this standard is slidably mounted a bracket or bearing 6, which can be clamped to the standard by the clamping screw 7. The standard is provided with a scale 8 which is marked off in inches and fractions thereof in the usual manner so that the height of the bracket thereon may be readily determined. Adjustably mounted in the bracket is the gem cutting and polishing arm, which has a swivel head composed of the back plate 9 which has a shank 10, through which shank passes an adjusting screw 11. In the ends of the adjusting screw are sockets in which are received the cone shaped ends of mounting screws 12 and 13 which pass in threaded contact through the arms 14 and 15 of the bracket. After the arm is secured in the bracket as shown in Figs. 1 and 2 the mounting screws are locked by lock nuts 16 and 17. To the back plate of the swivel head is secured the front plate 18 which has a hollow shank 19 which is split in the lower portion thereof and is provided with lugs 20 on each side of the split through one of which lugs a screw 21 passes and screws into the other lug so as to clamp the shank 22 of the facet regulator. In the back and front plates of the swivel head is a ball race in which are received balls 23 to provide a ball bearing engagement between the two plates to reduce friction. These plates are held together by a screw 24 which passes through the back plate 9 and into a headed bolt 25, the shank of which passes through the front plate 18. Between the head of bolt 25 and front plate is a spring washer 26 by means of which a spring pressure is kept upon the pront plate to hold it spring pressed against the back plate. The head of bolt 25 is provided with an indexed pointer 27 which is used in connection with a scale 28 on the front plate whereby the angle of the polishing arm is determined. Bolt 25 is secured by screw 24 firmly to the back plate so that it does not rotate. By the construction and use of a ball race between the parts of the head there are separated points of engagement which prevent any wabbling movement of one part as to the other. The shank of the facet regulator is provided with a small lug 29 which is received in a slot in the shank of the front plate to prevent any rotation of the shank of the facet regulator.

The facet regulator is composed of a cylindrical casing or box 30 in the upper end of which is screwed the enlarged end of shank 22, which when assembled is held in place by a small screw 31. In one side of casing 30 is a slot 32. In the central portion of the side walls of said slot are cut dovetailed grooves 32ª as shown in Fig. 4. In these grooves is mounted a detent slide 33 through which projects a hollow detent cylinder 34 the upper end of which is reduced and screw threaded and passes through the detent slide in screw threaded contact therewith, and the lower end passes down into slot 32. In the detent cylinder is mounted a detent pin 35 upon the outer end of which rests a spiral spring 36 which is held in place by a cap 37, which is screwed upon the outer end of cylinder 34. Within the regulator box is the facet regulating cylinder 38, which is rigidly mounted upon the shaft 39 of chuck 40 which holds the gem stick 41 to which the gem that is being operated upon is secured. The regulator box 30 is provided with a hollow shank 42 which surrounds the chuck shaft adjacent to the facet regulating cylinder as shown in Fig. 3. Surrounding this shank and a portion of the chuck shaft is the grip cylinder 43 which is grasped by the hand of the operator when using the tool. This grip cylinder revolves freely upon its supporting parts. The facet regulating cylinder is provided with a plurality of sockets 44 into which is received the end of detent pin to hold the cylinder at any particular point while a facet is being cut or polished. These sockets are arranged in annular rings and are evenly spaced around the circumference of the cylinder and are of such number as it is desired to have facets on the stone. At one side of the groove in the regulator box are notches 45 which are directly over the rings of sockets in the regulator cylinder. These notches have numbers 46 to indicate the number of sockets in the respective rings. The detent slide is provided with a spring 47, the outer end of which has a slight bend 48 therein which will enter the notches at the side of the groove so as to hold the detent slide in such position that the detent pin will enter the sockets of the ring which is indicated by the bend of the spring entering the marked notch, as shown in Fig. 1.

In the drawings I have shown a regulator cylinder with three series of sockets, but by making the regulator box and the regulator cylinder longer other rings of sockets can be provided. In the machine I have in use, I find that three are all that are required for small and medium work. I have also shown these sockets as composed of two rings of eight sockets each and one ring of 16 sockets, but the sockets can be arranged in any other number as desired.

Having described my invention what I claim is;

1. A gem cutting and polishing machine comprising a standard having a scale marked thereon; a nonrevoluble bracket slidably mounted on said standard and having clamping means to rigidly secure said bracket on said standard; a polishing arm having a vertically swiveling head mounted by cone bearings in said bracket, said arm being adapted to swing horizontally and means to vertically adjust said arm within said bracket, said adjusting means being in addition to the adjustment provided by the bearing means.

2. In a gem cutting and polishing machine, a cutting and polishing arm having a facet regulator therein, said regulator comprising a regulator box having a slot in one side thereof, said slot being provided with inclined walls; a detent slide mounted in said slot; a detent pin resiliently mounted in said slide; means to hold said slide in said slot at predetermined positions therein; and a detent cylinder having a plurality of rows of sockets in its outer periphery revolubly mounted in said box, said sockets being adapted to receive the end of the detent pin to hold the cylinder against accidental rotation.

3. In a gem cutting and polishing machine a polishing arm having a shank; an adjusting screw passing in threaded contact through said shank, said screw having sockets in the ends thereof; a standard; a bracket slidably mounted thereon, said bracket having arms at the top and bottom thereof, and at a distance apart somewhat greater than the length of the screw in the shank of the polishing arm; screws having conical ends passing through said arms and into the sockets in the screw in the shank of the polishing arm.

4. In a gem cutting and polishing machine the combination of a standard; a vertically movable bracket provided with arms, said bracket being operatively and adjustably secured upon said standard; means to rigidly secure said bracket upon said standard; a gem holding arm having a shank; an adjusting screw having sockets in the ends thereof passing through said shank in threaded contact therewith; and mounting screws passing through the arms of the bracket in threaded contact therewith and entering the sockets in the adjusting screw.

5. In a gem cutting and polishing machine having a standard, means to adjust the position of the gem holding arm comprising an adjusting screw passing in threaded contact through the shank of said arm; and means to revolubly and adjustably secure said adjusting screw to said standard.

In witness that I claim the foregoing I have hereunto subscribed my name this 8th day of November, 1907.

GERTRUDE S. REYNOLDS McMULLEN.

Witnesses:
G. E. HARPHAM,
S. B. AUSTIN.